United States Patent [19]

Jackson et al.

[11] Patent Number: 4,650,385
[45] Date of Patent: Mar. 17, 1987

[54] DAZE FASTENERS

[75] Inventors: L. Robert Jackson, Newport News; Randall C. Davis, Poquoson; Allan H. Taylor, Newport News, all of Va.

[73] Assignee: The United States of America as represented by the Administrator of the National Aeronautics and Space Administration, Washington, D.C.

[21] Appl. No.: 698,279

[22] Filed: Feb. 5, 1985

Related U.S. Application Data

[62] Division of Ser. No. 495,380, May 17, 1983, Pat. No. 4,572,699.

[51] Int. Cl.$^4$ .................. F16B 35/04; F16B 43/00
[52] U.S. Cl. .................. 411/166; 411/368; 411/424; 411/427; 411/531; 403/29
[58] Field of Search ............ 411/119, 120, 121, 166, 411/172, 173, 174, 176, 183, 339, 360, 366, 368, 371, 372, 378, 399, 424, 426, 500, 501, 531, 533, 537, 538, 427; 403/28, 29, 30, 408

[56] References Cited

U.S. PATENT DOCUMENTS

| | | | |
|---|---|---|---|
| 741,747 | 10/1903 | Walz | 411/166 |
| 860,829 | 7/1907 | Schmidt | 411/366 X |
| 1,215,530 | 2/1917 | Hightower | 411/366 X |
| 1,382,299 | 6/1921 | Purple | 411/119 X |
| 2,359,031 | 9/1944 | Goshia | 411/183 |
| 2,439,346 | 4/1948 | Nash | 411/360 X |
| 3,145,362 | 8/1964 | Kleven | 411/366 |

FOREIGN PATENT DOCUMENTS

| | | | |
|---|---|---|---|
| 735483 | 5/1943 | Fed. Rep. of Germany | 411/173 |
| 867928 | 1/1953 | Fed. Rep. of Germany | 411/424 |
| 3018014 | 11/1981 | Fed. Rep. of Germany | 403/408 |
| 637413 | 5/1950 | United Kingdom | 411/173 |
| 2070736 | 9/1981 | United Kingdom | 403/28 |
| 2087503 | 5/1982 | United Kingdom | 403/30 |
| 595553 | 2/1978 | U.S.S.R. | 411/176 |

Primary Examiner—Thomas J. Holko
Attorney, Agent, or Firm—George F. Helfrich; John R. Manning; Robert D. Marchant

[57] ABSTRACT

A daze fastener system for connecting two or more structural elements wherein the structural elements and fastener parts have substantially different coefficient of thermal expansion physical property characteristics is employed in this invention. By providing frusto-conical abutting surfaces between the structural elements and fastener parts any differences in thermal expansion/contraction between the parts is translated to sliding motion and avoids deleterious thermal stresses in the connection. An essential feature for isotropic homogeneous material connections is that at least two sets of mating surfaces are required wherein each set of mating surfaces have line element extensions that pass through a common point.

4 Claims, 9 Drawing Figures

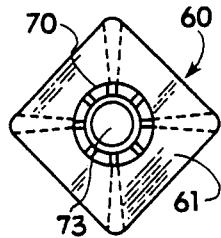
Fig. 5a
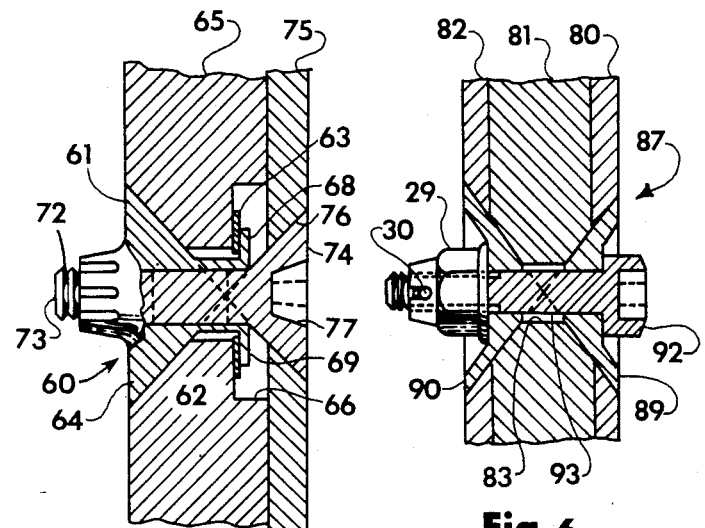
Fig. 5   Fig. 6
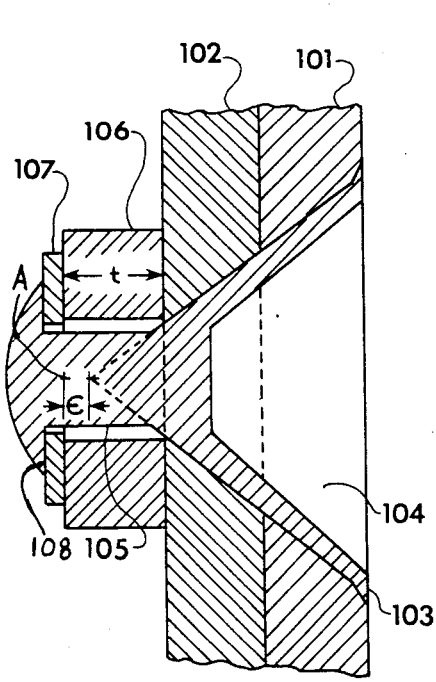
Fig. 7
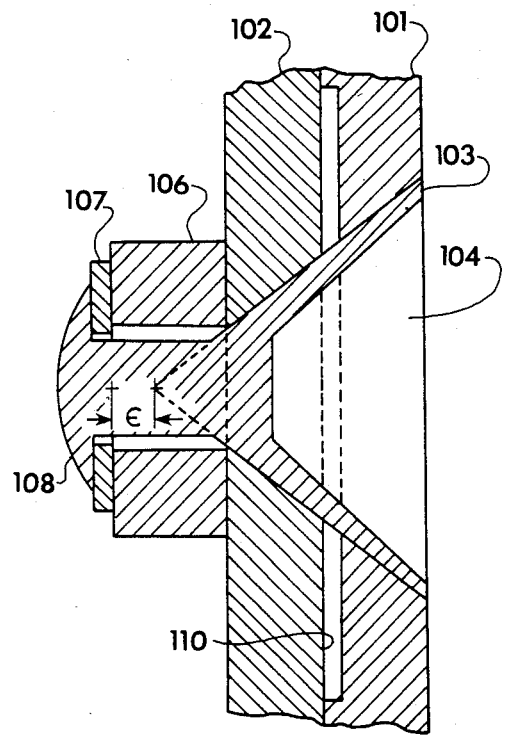
Fig. 8

DAZE FASTENERS

ORIGIN OF THE INVENTION

The invention described herein was made by employees of the U.S. Government and may be manufactured and used by or for the Government for governmental purposes without the payment of any royalties thereon or therefor.

This is a division of application Ser. No. 495,380, filed May 17, 1983, now U.S. Pat. No. 4,572,699.

BACKGROUND OF THE INVENTION

In the development of aerospace hardware it is often necessary to interconnect two or more structural panels or elements while permitting limited relative movement caused by thermal expansion or contraction of the parts during extreme temperature cycling as encountered in space flight. Thermal expansion or contraction of any arbitrary point in a homogeneous material at a uniform temperature relative to any reference point is directly proportional to the radial distance between the arbitrary point and the reference point. Restraint of the thermal expansion or contraction by a second homogeneous material surrounding the first homogeneous material will produce thermal stresses in both materials. This thermal stress condition will exist when the extension of line elements of all mating or contacting surfaces between the two materials do not pass through a common reference point and when the two materials have different coefficients of thermal expansion (when the temperatures of both materials is changed from some initial temperature) and when the materials each possess a modulus of elasticity.

If the coefficient of thermal expansion of the first homogeneous material is greater than that of the surrounding material, thermal stress will be generated when the materials are heated. Also, if the coefficient of thermal expansion of the first homogeneous material is less than the surrounding material, thermal stresses will be generated when the materials are cooled.

With a surrounding material initially contacting the homogenous material by mating surfaces (whose line element extensions do not pass through a common reference point when extended), separation of the materials will occur as the temperature is changed from the initial temperature provided: (1) when the coefficient of thermal expansion of the homogenous material is greater than that of the surrounding material, the materials will separate when cooled; (2) when the coefficient of thermal expansion of the homogeneous material is less than the surrounding material, the materials will separate when heated.

Maintaining contact between materials of different coefficient of thermal expansion as the temperature fluctuates may be as significant to the successful operation of structural devices utilizing these laws of physics as the avoidance of restraint of expansion.

To prevent either thermal stresses in, or separation of, the materials it is essential that the extension of line elements of all mating surfaces of the joined materials pass through a common reference point. The mating surfaces may be any combination of planes, cones and pyramids. Moreover, the line elements, when extended, of at least two such of all other mating surfaces must pass through the reference point and when the extended line elements of all other surfaces do not pass through the reference point these surfaces are required to be separated to avoid thermal stress when the thermal expansion is such to cause these mating surfaces to interfere with one another.

U.S. Pat. No. 4,229,018 issued to Bickerstaff et al on Nov. 10, 1981, applies some of the principles of the present invention although the structure and function of the respective devices are significantly different. Bickerstaff et al disclose a roll with tires clamped to it by frusto-conical rings of the same material composition as the roll shaft but different from the tires. The entire roll assembly rotates as it and others of like construction are pulled through and along the floor of an oven while transporting a sheet of glass resting thereon. The matching frusto-conical contact between the retaining rings and tires are designed so that differential thermal expansion between these parts causes sliding movement only of these frusto-conical surfaces relative to each other.

It is therefore an object of the present invention to provide a fastener that extends through two or more structural element parts that are to be connected in such a manner as to avoid thermal stresses in the connected area of the connected parts during thermal cycling.

It is a further object of the present invention to provide a fastener for alleviating thermal stresses in connected structural parts wherein the fastener and structural parts have substantially different coefficients of thermal expansion.

A further object of this invention is a fastener extending through two or more structural parts connected thereby wherein fastener/structural part contact is along mating planes.

A further object of the present invention is to to provide a connector element for two or more structural parts that maintains contact between the parts connected and the mating surfaces of the fastener during thermal cycling.

An additional object of the present invention is a fastener for extending through and connecting two or more structural elements wherein the fastener/structural element contact is along mating surfaces and an extension of the line elements of the mating surfaces pass through a common point.

BRIEF DESCRIPTION OF THE INVENTION

According to the present invention, the foregoing and additional objects are attained by providing two or more structural panels to be joined with confronting and countersunk apertures extending completely or partially therethrough and a fastener element positioned and secured within these apertures in fixed relationship therewith. The fastener employed in the preferred embodiment consists of an enlarged frusto-conical head bolt adapted to snugly engage the countersunk areas of the two structural panels and having an elongated threaded extension. A first washer formed of the same material as the structural panels is disposed over this threaded extension via an opening therein exceeding the diameter of the threaded bolt extension so as to provide a spacing between the bolt and the interior diameter of the washer. A second metal washer having essentially the same interior diameter as the exterior diameter of the bolt is positioned over and against the first washer by a suitable threaded nut to thereby force the frusto-conical head of the fastener element into retained engagement with the two structural panels being joined. A cotter pin is then positioned through a hole in the end of the threaded bolt extension to ensure retention of the nut thereon. The frusto-conical end of the fastener element is provided with a suitable opening therein for inserting a screw driver, hex wrench or the like to assist in tightening the nut on the bolt. In lieu of the threaded bolt arrangement, the frusto-conical head fastener element may be in the form of a rivet and the elongated extension thereof deformed over the second washer. Also in lieu of the frusto-conical head, a frusto-conical insert of the same material as the fastener may be employed and the fastener element may be provided with a central opening therein to permit separate conventional bolt or rivet connectors being employed. Also, a double frusto-conical insert or head may be provided at opposite panel surfaces to form the connector element. In this embodiment, each part has an elongated tubular end and an enlarged head shaped to snugly fit the countersunk exterior aperture of the structural elements being joined and the tubular parts are disposed in telescopical relationship and internally positioned within the apertures. Suitable structure such as a through extending bolt/nut or a rivet extends through the fastener parts for retention of the fastener within the connected parts. The telescoped tubular ends of the fastener are of a smaller outside diameter than the interior diameter of the structural element apertures so as to permit relative thermal expansion thereof during temperature cycling of the connected parts. The enlarged head end of each fastener part mates with the countersunk aperture in the surface of one of the connected structural elements. These mating surfaces or planes of the connector elements have line extensions which pass through a common single point. The line elements of mating surfaces can be any shape surface without generating thermal stress while maintaining a constant contact pressure provided the extension of the line elements of all mating surface pass through the same point. At least two such mating surfaces with coincident vertices are required and any other mating surface that does not have line elements that pass through the same point of coincidence as these two must have a clearance therebetween to avoid thermal stress, i.e., these other mating surfaces cannot contact one another at any temperature if thermal stress is to be avoided.

BRIEF DESCRIPTION OF THE DRAWINGS

A more complete appreciation of the present invention and many of the attendant advantages thereof will be readily apparent as the same becomes better understood by reference to the following description when considered in connection with the accompanying drawings wherein:

FIG. 5 is a part sectional view of an alternate embodiment of the fastener of the present invention adapted for blind fastening;

FIG. 5a is an end view of the FIG. 5 embodiment;

FIG. 6 is a part sectional view of an embodiment of the present invention connecting multiple panels together;

FIG. 7 is a sectional view of a fastener system according to the present invention connecting relatively thick non-isotropic panels; and FIG. 8 is a view similar to FIG. 7 and illustrating a slight modification thereof.

DETAILED DESCRIPTION OF THE INVENTION

Figure 1:
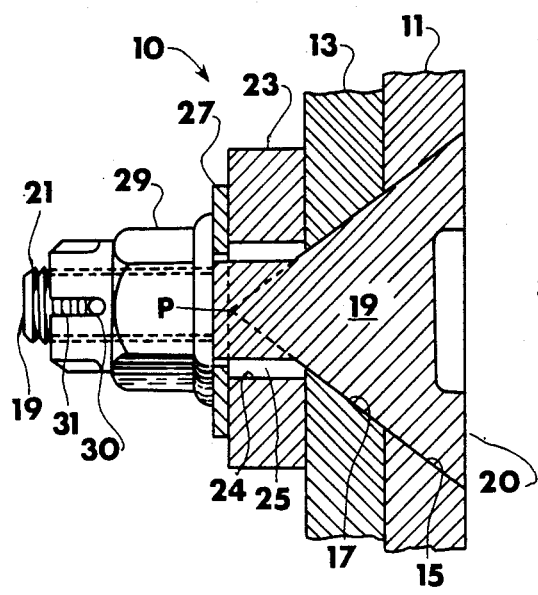
FIG. 1 is a part sectional view of the preferred embodiment of the fastener system employing a bolt/nut connection according to the present invention.

Referring now to the drawings wherein like elements are referred to by the same reference numeral throughout the several views and more particularly to FIG. 1, there is shown the preferred embodiment of the daze fastener system according to the present invention and generally designated by reference numeral 10. Fastener 10 in this embodiment is employed to connect two structural panels 11 and 13 formed of carbon-carbon composite or other material useful for extreme high or low temperature structural applications and wherein the panel material composition has a large difference in coefficient of thermal expansion from that of the fastener material. Fastener 10 must provide a snug fit between panels 11 and 13, at all temperatures during extreme temperature cycling as encountered in aerospace structural applications, while also remaining free of thermal stress. As shown in FIG. 1, panels 11 and 13 are provided with adjacent frusto-conical apertures 15, 17 extending therethrough and receive bolt 19. Bolt 19 is provided with a frusto-conical head 20 adapted to snugly fit within and extend through apertures 15 and 17. A spacer washer 23 is positioned over shank 21 of bolt 19 to abut against panel 13. Spacer washer 23 is provided with an interior diameter opening 24 exceeding the exterior diameter of shank 21 so as to provide a clearance therebetween and is designated by reference numeral 25. Spacer washer 23 thickness is selected to provide adequate bearing area between the head 20, and panels 11 and 13 and is formed of the same material composition as these panels. A metal washer 27 of the same material as bolt 19 and of substantially the same interior diameter as the exterior diameter of shank 21 is also disposed on shank 21 so as to engage spacer washer 23. A hex nut 29 of the same material as bolt 19 is threaded onto shank 21 of bolt 19 to firmly engage metal washer 27 and a conventional cotter pin 30 is placed through shank 21 and a groove 31 provided in an extension on hex nut 29. As shown by dotted lines, line element extensions from the surfaces of conical head 20 extend through a common point P on a plane with metal washer 27 and the mating surface of spacer washer 23.

Figure 2:
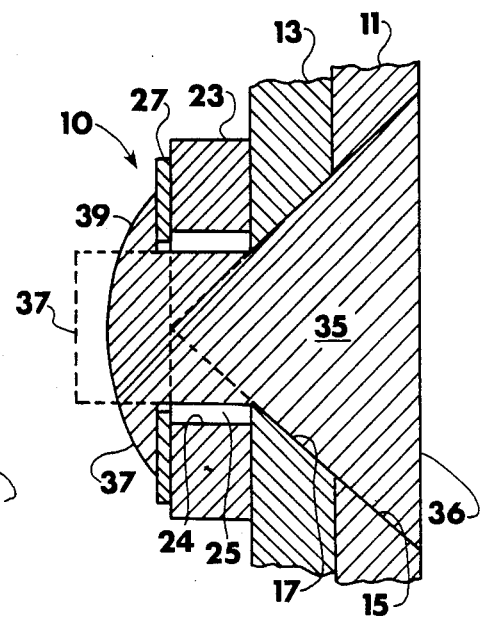
FIG. 2 is a view similar to FIG. 1 illustrating a rivet connection.

Referring now more particularly to FIG. 2, a rivet 35 having a frusto-conical head 36 mating with frusto-conical apertures 15, 17 of panels 11 and 13, is provided with a malleable shank portion 37. After positioning enlarged spacer washer 23 and metal washer 27 over shank 37, the end thereof is deformed in a conventional manner to provide the oval terminus 39 thereon to engage and compress washer 27 against spacer washer 23 and thereby fasten panels 11 and 13 together. As in FIG. 1, the dotted line element extensions of frusto-conical head 36 extend through a common point on the plane of metal washer 27 and the mating surface of spacer washer 23.

Figure 3:
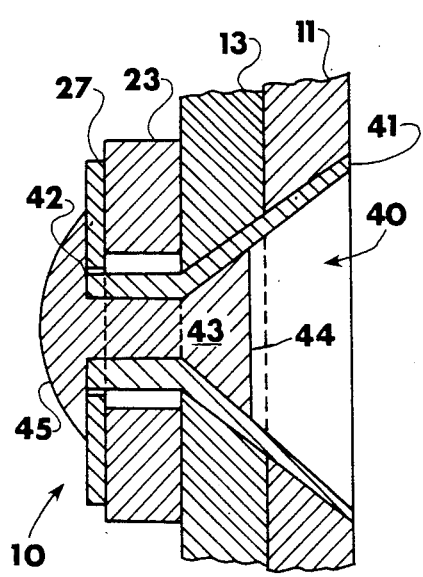
FIG. 3 is a similar view illustrating an alternate embodiment of the fastener system of FIGS. 1 and 2.

Referring now to FIG. 3, a hollow daze insert fastener 40 is employed to connect panels 11 and 13. Fastener 40 in this embodiment is essentially funnel shaped with an enlarged frusto-conical end 41 and a reduced diameter tubular end 42. In this embodiment, a rivet having a frusto-conical head 44 is disposed within the hollow cone area of fastener insert 40 and the malleable shank portion 43 of the rivet extends through the elongated tubular end 42 of fastener 40. After positioning spacer washer 23 and metal washer 27 over the tubular end 42 of fastener 40, malleable shank 43 is deformed in a conventional manner to provide an oval terminus 45 thereon to engage and compress washer 27 against spacer washer 23 as in the preceding embodiment.

Figure 4:
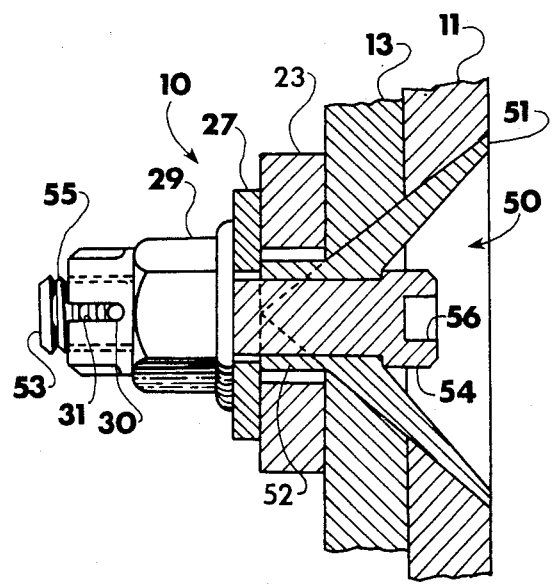
FIG. 4 is a view similar to FIG. 3 of another connection illustrating a bolt/nut connection.

Referring now to FIG. 4 another hollow daze insert fastener is shown and generally designated by reference numeral 50. Fastener 50 is also essentially funnel shaped and has an enlarged frusto-conical end 51 and a reduced diameter tubular end 52. In this embodiment, a bolt 53 having a head 54 and a threaded shank 55 is disposed through fastener insert 50 with the head 54 maintained in the hollow frusto-conical end 51. Fastener 50 is utilized to connect panels 11 and 13 by tightening nut 29 onto threaded bolt shank 55 after insert fastener 50, bolt 53, spacer washer 23 and metal washer 27 are positioned as shown in FIG. 4. As in FIG. 1, a conventional cotter pin 30 is positioned through a suitable opening (not shown) in shank 55 to retain nut 29 in locked position. Head 54 of bolt 53 is also provided with a depressed area 56 therein adapted to receive a suitable socket wrench, screw driver or the like to aid in tightening nut 29.

Referring now to FIGS. 5 and 5a, a daze insert fastener for blind attachments is illustrated and designated generally by reference numeral 60. In this embodiment, insert fastener 60 is provided with an enlarged pyramid shaped head 61 and a reduced diameter tubular shank 62 extending through a panel 65. A metal washer 63 is disposed in a depressed area 66 provided in the opposite surface of panel 65 from the pyramid shaped aperture 64 therein receiving pyramid head 61 of insert 60. The plane of the mating surfaces of washer 63 and panel 65 passes through the common vertices of insert frusto-pyramid head 61 and frusto-conical head 74 of bolt 73. The tubular shank 62 is provided with either longitudinally disposed multiple splits or flared to permit bending thereof 90° relative to the center axis of the tubular shank 62 to abut against metal washer 63 and retain fastener insert 60 in position. Two split segments of tubular shank 62 are shown in FIG. 5 and designated by reference numerals 68 and 69. The square end of pyramid head 61 is shown more clearly in FIG. 5a and includes an integral central extension thereon as designated by reference numeral 70. Extension 70 is provided with internal threads and serves to receive the threaded shank 72 of bolt 73 and the extension 70 is split wherein the metal between the splits is deformed inward during manufacture of frusto-pyramid head 60 to provide a self-locking feature for bolt 73. The opposite end of bolt 73 is an enlarged frusto-conical head 74 received within a frusto-conical aperture 76 provided through panel 75. In operation, panel 65 is provided with pyramid shaped insert fastener 60 secured therein prior to permanent attachment of panel 65 in operative position by suitable mechanism (not shown). Subsequent assembly or fastening of panel 75 is then made possible by bolt 73 passing therethrough for connection with threaded extension 70 provided on the blind side of panel 65. Tightening of bolt 73 is facilitated by the square pyramid shape of insert 60 retaining the insert in a non-rotative mode by turning bolt 73 by aid of a screw driver, torque socket wrench, or the like, inserted in opening 77 in head 74 thereof.

Referring now to FIG. 6, multiple carbon-carbon or like homogeneous structural panels may also be connected by use of the daze fasteners of the present invention without danger of thermal cycling stresses causing the connections to fail. In the illustrated embodiment three panels designated by reference numerals 80, 81 and 82 are shown connected by a daze fastener system generally designated by reference numeral 87. In this embodiment, a pair of essentially hollow frusto-conical inserts 89, 90 are disposed within confronting frusto-conical apertures formed through respective panels 80, 81 and 82 of the panel group. The interior panel 81 is provided with an opening 83 therein disposed coaxial and intermediate to the confronting conical apertures. Inserts 89 and 90 are fastened together via bolt 92 as in the preceding embodiments. The shank portion 93 of bolt 92 disposed within interior panel 82 is by design of a smaller exterior diameter than the coaxial opening in panel 81 to provide adequate clearance between the bolt and panel to permit anticipated expansion/contraction of the parts during extreme temperature cycling.

In each of the embodiments of FIGS. 1–6 described hereinabove, the panels connected are of homogeneous isotropic construction and the fastener elements employed are homogeneous materials that exhibit extreme different coefficients of thermal expansion ($\alpha$). In each of these embodiments it is essential that line element extensions of two or more of the mating surfaces of the fastener elements pass through a common point. In the embodiments utilizing the metal washer connector element, this common point is also on a plane with the metal washer where it contacts the spacer washer.

Referring now more particularly to FIGS. 7 and 8, the application of the present invention to connect relatively thick carbon-carbon or like structures is illustrated. As shown, the coefficient of thermal expansion ($\alpha$) of the materials 101 and 102 being joined and spacer washer 106 therein is greater through the thickness than in plane. However, the fastener 104 and the metal washer 107 are made of homogeneous material. In these instances the line element extensions may deviate from a common point by a distance ($\epsilon$) according to the formula $$\epsilon = \frac{\alpha_{cc}}{\alpha_m} t$$

wherein $\epsilon$ is the distance permitted for the vortex of line element extensions of the insert to deviate from the mating plane of the connecting metal washer and the spacer washer;

$\alpha_{cc}$ is the coefficient of thermal expansion for the carbon-carbon panels being connected;

$\alpha_m$ is the coefficient of thermal expansion of the washer and insert material fasteners; and t is thickness of the carbon-carbon spacer washer.

As shown in FIG. 7, non-isotropic carbon-carbon panels 101, 102 are provided therein, confronting and frusto-conical apertures (not designated) are provided in panels 101 and 102 of such dimension as to receive in contacting engagement therewith hollow frusto-conical head 103 of fastener insert 104. Insert 104 is provided with an elongated malleable segment 105 extending through panels 101 and 102. After positioning spacer washer 106 and metal washer 107 on segment 105, the end thereof is deformed to provide terminus 108 thereon in contact with metal washer 107 to retain panels 101 and 102 connected by fastener insert 104. As in the previous embodiments the opening or interior diameter of spacing washer 106 is larger than the exterior diameter of segment 105 to permit relative thermal expansion/contraction of the parts without inducing stress thereon.

Referring now to FIG. 8, a slight modification of that shown in FIG. 7 is illustrated wherein a spot face surface area is removed from the interior of panel 101 to provide an opening 110. This area serves to permit bending of panel 101 during thermal expansion/contraction in this region to further reduce thermal stresses and provide a snug fit between the panels 101, 102 and between the panels and frusto-conical head 103. In each of FIGS. 7 and 8 the frusto-conical head is shown as hollow but this is primarily for a weight saving measure and solid connectors may be employed as desired. Also, bolt type connectors could be employed in lieu of the rivet connection in each of the embodiments of FIGS. 7 and 8 if so desired.

The embodiments of FIGS. 1 to 6 may also be used for joining non-homogeneous materials that have a greater coefficient of thermal expansion through their thickness than in plane by making the metallic fastener of a material (also non-homogenous) that has a higher coefficient of thermal expansion along its length (L) than across its diameter (D). This was accomplished by adding fiber reinforcement within the fastener material. The amount of reinforcement is that required to produce the same ratio of $\alpha$ (L/D) as through-the-thickness to in-plane of the elements being joined.

Although no specific materials have been designated for the panels and fasteners discussed in the preferred embodiments herein, the invention is specifically designed for joining elements that have a large difference in coefficient of thermal expansion from that of the fastener elements. Specifically, the invention is useful in joining carbon-carbon composites structural panels, ceramic panels, glass and the like with metal and metal alloy fastener elements. The term carbon-carbon composite as employed herein refers to any carbon fiber-carbon matrix structure. In one specific embodiment panel 11, 13 and spacer washer 23 were constructed of a carbon-carbon composite obtained from the Vought Corporation and the fastener elements including the metal washer 27 were constructed of an oxide dispersion strengthened alloy (MA-956E) capable of withstanding thermal cycling from cryogenic up to 2200° F. MA-956E is a product of Huntington Alloy, Incorporated. The invention is not restricted to these specific examples and obviously other materials having the physical property characteristics needed for specific applications are obviously considered within the teachings of this invention.

The mode of operation of the invention highlights the novelty thereof. When a structural body joined by the daze fastener system of the present invention is subject to extreme elevated temperatures, the metal fastener components, which have a much greater coefficient of thermal expansion than the members being joined expand in all directions from the coincident vertices of the cone formed by the frusto-conical head of the rivet or bolt and the plane of the mating surface between the metal washer and the spacer washer. Consequently, the bearing surfaces between the head and the carbon-carbon panels remain undisturbed, i.e., the frusto-conical head slides along the countersunk surfaces in the carbon-carbon as the head expands, and the metal washer slides along the spacer washer as the metal washer and nut expand. The head neither departs from nor expands into the carbon-carbon. The contact force between the fastener and the carbon-carbon remains constant for all temperatures. A radial clearance is provided around the cylindrical portion of the insert to allow unrestrained thermal expansion of this part of the fastener. Since no part of the fastener is restrained from expanding as it is heated, no thermal stress is induced in either the fastener or the material being joined. Thus, for a large difference in coefficients of expansion ($\alpha$) between the fastener and the material being joined, zero thermally induced strain ($\epsilon$) or thermal stress is present in either the fastener or the material being joined, because the subject fastener is free to expand thermally without restraint by the carbon-carbon, a feature provided by the novel structure of the invention. The acronym "daze" has been coined to characterize this feature. However, another significant feature is that a snug fit exists between the parts being joined and between the fastener and the parts being joined at all temperatures. The amount of bearing force (snugness of fit) may be controlled during manufacture of the structure either by the length of the cylindrical portion of the insert (which may be shimmed) or by the flaring of the tubular end of the rivet. Different cone angles may be used for the rivet head and insert and the cone angle can be selected greater than 0° and less than 90°.

Although specific embodiments of the invention have been described herein they are to be considered as exemplary of the novel features thereof and are not exhaustive. There are obviously many variations and modifications of these specific exemplary examples that will be readily apparent to those skilled in the art in the light of the above teachings without departing from the spirit or scope of the appended claims. It is therefore to be understood that the invention may be practiced otherwise than as specifically described.

What is claimed as new and desired to be secured by Letters Patent of the United States is:

1. A fastener for connecting two or more structural elements having confronting apertures therein to receive the fastener and wherein the structural elements and fastener have substantially different coefficient of thermal expansion physical property characteristics comprising:

a first elongated fastener element having a tubular body portion and an integral head portion formed on the tubular body;

said tubular body portion being positioned within at least one of the confronting apertures of the structural elements to be connected thereby and being provided with an external diameter that provides adequate clearance along the length thereof between said tubular body portion and the aperture to permit anticipated thermal expansion of said tubular body therein and said head portion being provided with a frusto-pyramid shaped exterior surface having three or more sides consisting of line elements that when extended form a first vertex and being received in a mating end area portion of the aperture formed within the structural element receiving said first fastener element;

a second elongated fastener element having a cylindrical body portion and a head portion and positioned within a confronting aperture of another structural element such that the cylindrical body portion of said second elongated fastener element is telescopically received within the tubular body portion of said first elongated fastener elements;

said head portion of said second elongated fastener element having a frusto-conical exterior surface consisting of line elements that when extended form a second vertex and received by a mating area portion of the aperture formed within the structural element receiving said second elongated fastener element wherein said second vertex of said frusto-conical head is coincident with said first vertex of said frusto-pyramid head of said first fastener element; and means for connecting said first and said second elongated fastener elements to thereby fasten the structural elements together.

2. The fastener of claim 1 wherein said means connecting said first and said second elongated fastener elements includes said second fastener element being an elongated bolt having a threaded segment extending through said first fastener element, said first fastener element having an internally threaded area for receiving said threaded segment of said bolt.

3. The fastener of claim 2 wherein said tubular body portion of said first elongated fastener element is bent at the open end thereof to engage and retain a metal washer and to retain said first fastener element, said metal washer being disposed within a depressed area within said structural element receiving said first elongated fastener element and the plane of contact of said metal washer with the elements being joined passes through the common point or coincident of vertices said first and said second fastener elements.

4. The fastener of claim 3 wherein said frusto-pyramid shaped exterior surface of said first fastener element prevents turning thereof during threadingly engagement by said threaded segment of said bolt, and an opening provided in the head of said bolt to permit engagement of a suitable wrench for applying rotative movement to said bolt to thereby permit use of the fastener for blind attachment.

* * * * *